G. F. KINZEL.
COOKING UTENSIL.
APPLICATION FILED APR. 3, 1919.
1,334,908.
Patented Mar. 23, 1920.
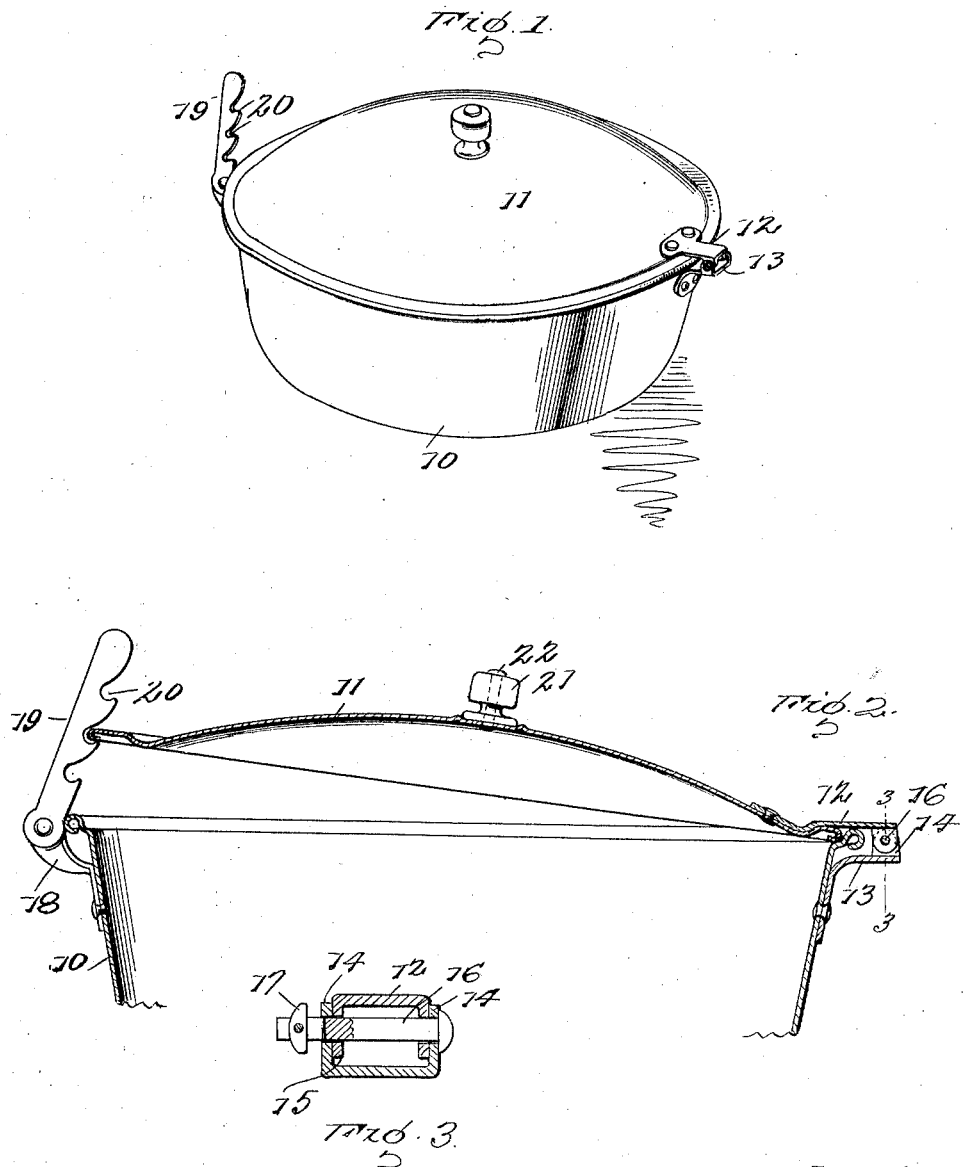

UNITED STATES PATENT OFFICE.

GEORGE F. KINZEL, OF WEST ORANGE, NEW JERSEY.

COOKING UTENSIL.

1,334,908.     Specification of Letters Patent.     Patented Mar. 23, 1920.

Application filed April 3, 1919. Serial No. 287,116.

*To all whom it may concern:*

Be it known that I, GEORGE F. KINZEL, a citizen of the United States, residing at West Orange, in the county of Essex and State of New Jersey, have invented certain new and useful Improvements in Cooking Utensils, of which the following is a specification.

This invention has relation to cooking utensils, and has for an object to provide means for supporting a cover above the container whereby to permit the escape of steam and at the same time to protect the contents.

Another object of the invention is to provide means for hingedly connecting the cover to the container and also to permit the facile detachment of the cover therefrom when occasion requires.

In addition to the foregoing, this invention comprehends improvements in the details of construction and arrangement of parts, to be hereinafter described and particularly set forth in the appended claim.

In the accompanying drawings in which similar and corresponding parts are designated by the same characters of reference throughout the several views in which they appear.

Figure 1 is a view in perspective of a container and cover embodying my improvements.

Fig. 2 is a view thereof in section, and

Fig. 3 is a detail section taken on the line 3—3 of Fig. 2.

With reference to the drawings, 10 indicates a container or sauce-pan and 11 a cover. A hinge connection is provided comprising a pair of leaves 12 and 13 the latter being angular with one end secured to the container and its other formed with upstanding apertured ears 14. The leaf 12 is secured at one end to the cover and is provided at its other end with depending apertured ears 15 to fit between the ears 14. A pin 16 is inserted in the ears to pivotally connect the leaves, and the penetrating end is preferably split and a pawl 17 pivotally mounted therein so that the pawl may be turned at right angles to prevent accidental dislodgment of the pin.

At a point on the container opposite the hinge I provide a bracket 18 formed of a strip twisted and apertured to pivotally support a prop 19 in the form of a strip formed with a notched edge 20. The free edge of the cover may be rested in any one of the notches and thus be held in elevated position at an angle. The angle may be varied by transferring the cover to one of the other notches and the prop may be positioned to receive the same. Thus it will be seen that I have provided a novel utensil which possesses many advantages which will be readily apparent to those familiar with the use of utensils. If desired a handle 21 of cork may be provided for the cover, secured in place by means of a rivet or bolt 22 as shown.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new and desire to secure by United States Patent is:

A kitchen utensil including a cover therefor, a hinged connection secured to the container, a pair of spaced ears formed on said hinged connection, a leaf secured to the cover, a pair of apertured ears on said leaf to be inserted between the first mentioned ears, a pin extending through all of said ears, said pin having the insertible end slotted longitudinally, and a latch member pivotally mounted in said slotted portion movable in one position to permit insertion of the pin and movable at right angles to the pin to prevent accidental withdrawal thereof.

In testimony whereof I affix my signature in presence of two witnesses.

GEORGE F. KINZEL. [L. S.]

Witnesses:
CHAS. L. FIALA,
GEORGE W. COLE.